United States Patent [19]

Brady et al.

[11] 4,384,761
[45] May 24, 1983

[54] FERROFLUID OPTICAL SWITCHES

[75] Inventors: Michael J. Brady, Brewster; Lawrence V. Gregor, Hopewell Junction; Mark Johnson, Ossining, all of N.Y.

[73] Assignee: International Business Machines Corporation, Armonk, N.Y.

[21] Appl. No.: 164,389

[22] Filed: Jun. 30, 1980

[51] Int. Cl.³ ............................................. G02B 5/14
[52] U.S. Cl. .................................. 350/96.20; 350/267; 350/360
[58] Field of Search ...................... 350/96.20, 267, 266, 350/360 R

[56] References Cited

U.S. PATENT DOCUMENTS

| 3,381,248 | 4/1968 | Furth | 335/51 |
| 3,906,415 | 9/1975 | Baker | 335/47 |
| 3,910,687 | 10/1975 | Iwata | 350/267 |
| 4,035,637 | 7/1977 | Lenhart et al. | 250/231 P |
| 4,082,435 | 4/1978 | Zeitz | 350/269 |
| 4,121,884 | 10/1978 | Greenwood | 350/96.15 |

OTHER PUBLICATIONS

Magnetic Fluid, Ferrofluidics Corp., Burlington, Mass., Apr. 73, pp. 17–18.
Kaiser et al., Some Applications of Ferrofluid Magnetic Colloids, IEEE Trans., vol. Mag. 6, No. 3, 9/70.
Raj et al., Magnetic Fluid Seals Laser Focus, 4/79, pp. 56–61.
Leighton, Fiber Optic Shutter, IBM Technical Disclosure Bulletin, vol. II, No. 8, Jan. 1969.

Primary Examiner—David K. Moore
Attorney, Agent, or Firm—Ronald L. Drumheller

[57] ABSTRACT

A controllable magnetic field influences the position or shape or density distribution of a ferrofluid so that the ferrofluid causes or prevents the coupling of light between optical paths either by physically causing movement of a waveguide (e.g., optical fiber) or by itself physically moving into or out of a coupling region between optical paths.

19 Claims, 7 Drawing Figures

FERROFLUID OPTICAL SWITCHES

DESCRIPTION

1. Technical Field

This invention relates to optical switches and more specifically to fiber optical switches which are actuated by ferrofluid acting under the influence of a controlled magnetic field.

2. Background Art

Since a light beam can be easily generated and modulated so as to carry much more information than is possible with an electrical signal, light beams have a distinct advantage in communicating information between two or more locations. High quality low loss optical fibers are now readily available so that optical fibers are now being used widely to define optical paths for such light beams. Fiber optical switches are needed to control routing of optical beams along alternative fiber optical paths.

Most optical switches have one or more mechanical actuation elements which move. Due to the small size of optical fibers, such designs are inherently difficult to fabricate and furthermore are subject to wear and other mechanical problems. In U.S. Pat. No. 4,035,637 a mechanical element of an optical switch is moved by fluid pressure, but the design still contains mechanical moving parts and is rather complicated and not readily reduced to size for use with optical fibers.

U.S. Pat. No. 4,082,435 describes an optical switch having a mechanical sliding element which is physically moved by magnetic fields. This switch is also difficult to fabricate in a size suitable for use with individual optical fibers and it has mechanical disadvantages such as frictional wear and dirt accumulation.

U.S. Pat. No. 4,121,884 describes an optical switch where a fluid is controllably moved into the optical path. This switch does not have moving mechanical parts but it requires construction of a parallel sided cell within an optical fiber and at an angle to the fiber axis. Such a structure is not easily constructed. None of the described references suggests use of a ferrofluid in an optical switch.

Ferrofluids are colloidal dispersions of subdomain magnetic particles in a liquid carrier which retain liquid characteristics in the presence of a magnetic field. Ferrofluids of various types and in various carriers are commercially available from Ferrofluidics Corp. of Burlington, Mass. They are described in detail, for example, in a brochure distributed by Ferrofluidics Corp. entitled "Magnetic Fluid-An Introduction to the Phenomena and Applications of Magnetic Fluid Technology." Ferrofluids have been used mainly as seals but use is also known in pumping, energy conversion, viscous damping, lubrication, accelerometers, levitation bearings, specific gravity meters, and medical treatments, for example. Ferrofluids and their uses are described in detail by R. Kaiser et al., in "Some Applications of Ferrofluid Magnetic Colloids," IEEE Trans. on Magnetics, Vol. MAG-6, No. 3, at pages 694–698 (Sept. 1970) and by K. Raj et al., in "Magnetic fluid seals," Laser Focus, April 1979, at pages 56–61.

U.S. Pat. No. 3,906,415 describes the use of ferrofluid to move mercury pellets around in electrical switching apparatus. U.S. Pat. No. 3,381,248 describes the use of a magnetic field to break an electrical circuit. The magnetic field induces current flow in an electrically conductive liquid which interacts with the applied magnetic field and causes movement of the liquid away from an electrical switch contact. Both of these references are dealing with the problem of quickly switching large electrical currents and voltages without arcing damage to the switch. Such problems (arcing) do not occur in light switches.

The object of this invention is to provide optical switching apparatus which is simple and inexpensive to fabricate and which switches a light path rapidly and without frictional wear to the switch.

Another object is to provide a switch of this type for coupling individual optical fibers.

Still another object is to provide a reliable optical switch which may be easily fabricated with commercially available materials.

These and further objects and advantages which are achieved by this invention will become more apparent as the following detailed description proceeds.

DISCLOSURE OF INVENTION

A controllable magnetic field influences the position or shape or density distribution of a ferrofluid so that the ferrofluid causes or prevents the coupling of light between optical paths either by physically causing movement of a waveguide (e.g., optical fiber) or by itself physically moving into or out of a coupling region between optical paths.

BEST MODE FOR CARRYING OUT THE INVENTION

Figure 1:
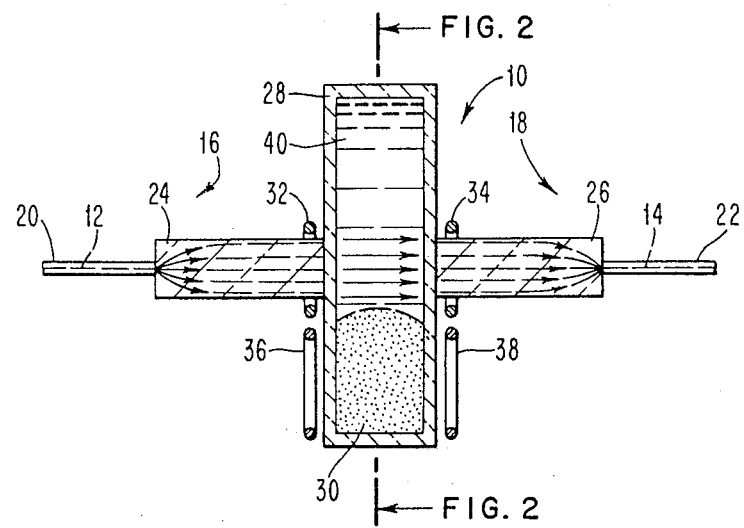
FIG. 1 is a front cross-sectional view of a single pole single throw optical switch in accordance with this invention wherein the ferrofluid changes position.
Figure 2:
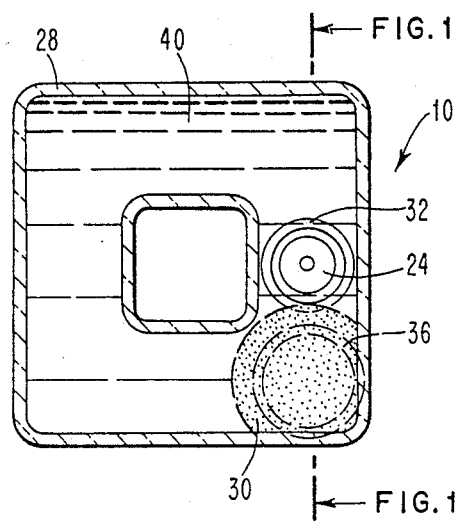
FIG. 2 is a side cross-sectional view of the optical switch of FIG. 1.

Referring now to the drawings in which FIG. 1 and FIG. 2 illustrate an optical switch 10 interposed between a first light path 12 and a second light path 14. Light paths 12, 14 are defined respectively by waveguides 16, 18, which preferably comprise optical fibers 20, 22 and focusing elements 24, 26. Focusing elements 24, 26 preferably act as collimators to facilitate coupling of light between waveguides 16, 18. In the illustrated embodiment focusing elements 24, 26 are Selfoc lenses (Selfoc is a trademark of the Nippon Sheet Glass Co., Ltd.). A Selfoc lens is a piece of graded index optical fiber of appropriate length and may be used to collimate or focus light travelling along an optical fiber. Focusing elements 24, 26 are spaced apart and aligned with each other so that light travelling along waveguide 16 will be coupled to waveguide 18 so long as the space between elements 24, 26 is transparent to the light.

Interposed between waveguides 16, 18 is a toroidal enclosure 28 containing a pellet 30 of ferrofluid. Coils 32, 34 surround Selfoc lenses 24, 26 respectively while additional coils 36, 38 are positioned adjacent thereto. When coils 32, 34 are energized, a magnetic field is created in the space between Selfoc lenses 24, 26. Ferrofluid tends to be drawn into a magnetic field. Therefore, when coils 32, 34 are energized, ferrofluid pellet 30 moves into the space between Selfoc lenses 24, 26 and blocks light from coupling between light paths 12, 14. When coils 32, 34 are de-energized, the magnetic field created thereby collapses and ferrofluid 30 tends to drop to the position shown under the influence of gravity. Gravity may or may not be acting in a suitable direction and may or may not be sufficiently powerful to actually move ferrofluid 30. Coils 36, 38 thus are relied upon instead to move ferrofluid 30 to the position shown. Coils 36, 38 are energized as coils 32, 34 are de-energized, thereby creating a magnetic field in the space between coils 36, 38 instead of in the space between coils 32, 34. Ferrofluid pellet 30 again moves toward the magnetic field, which brings the pellet to the position shown. Coils 36, 38 are de-energized, of course, when coils 32, 34 are energized.

Enclosure 28 is transparent, at least in the region between Selfoc lenses 24, 26, and preferably is fabricated from a square cross-section glass tube by bending and fusing it into a toroidal shape. The space inside enclosure 28 not occupied by ferrofluid 30 is preferably filled with a transparent index matching fluid 40 which is not miscible with the ferrofluid.

The optical characteristics of fluid 40 are selected to enhance transfer of light between the Selfoc lenses when the ferrofluid is in the position (configuration) shown. Since ferrofluid is opaque, when the ferrofluid is moved to a position between the Selfoc lenses (a second configuration) light paths 12, 14 are not coupled together.

Figure 3:
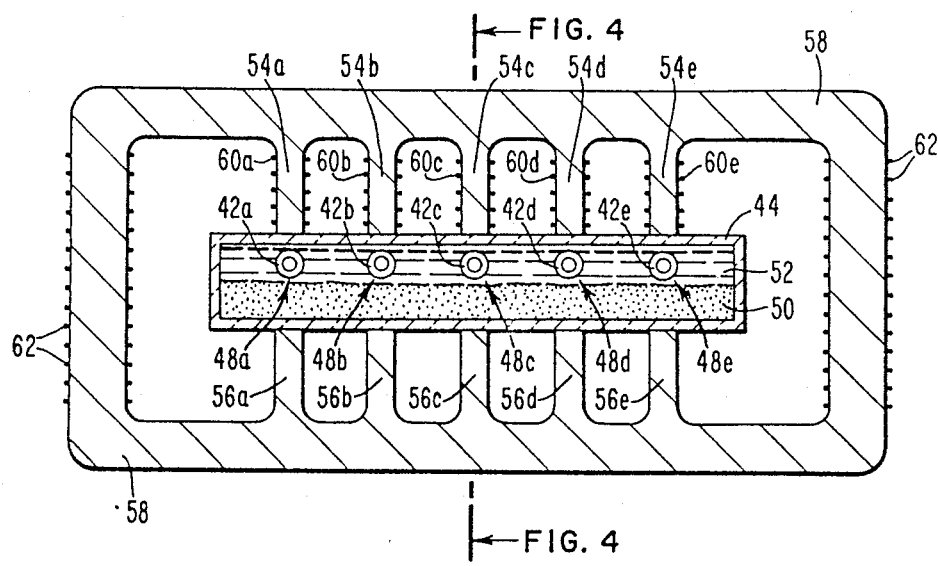
FIG. 3 is a front cross-sectional view of a five pole individual or ganged single throw optical switch in accordance with this invention wherein the ferrofluid changes shape.
Figure 4:
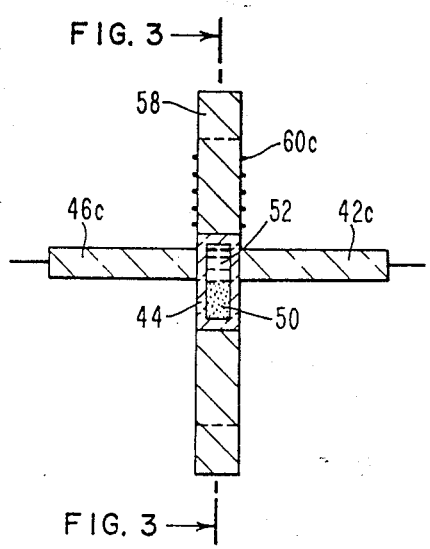
FIG. 4 is a side cross-sectional view of the optical switch of FIG. 3.
Figure 5:
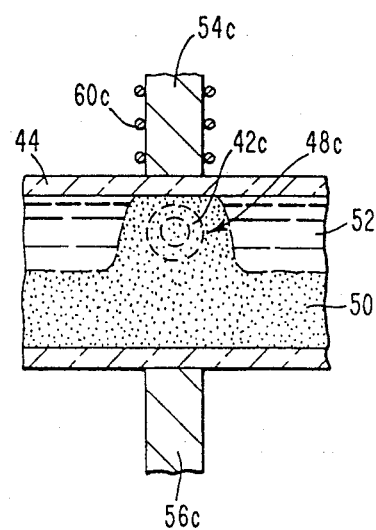
FIG. 5 is an enlarged view of a portion of FIG. 3 during actuation of an illustrated pole.

FIGS. 3–5 illustrate another optical switch, this one having an array of five light paths 42a–e on one side of a rectangular enclosure 44 facing a corresponding second array of five light paths 46a–e on the opposite side of the enclosure. Each of the ten light paths is constructed as shown and described with respect to the previous embodiment illustrated in FIGS. 1–2 and includes an optical fiber coupled to a collimating Selfoc lens.

The enclosure is partly filled with ferrofluid 50 to a level just below the coupling regions 48a–e between corresponding Selfoc lenses. Index matching fluid 52 fills the enclosure above the ferrofluid. Above each of the coupling regions 48a–e is a magnetic pole piece 54a–e. A corresponding pole piece 56a–e is below each coupling region. All of the pole pieces 54a–e above the coupling regions are connected through common magnetic arms 58 to the pole pieces 56a–e below the coupling regions. Each pair of pole pieces associated with a coupling region may be energized via a coil 60a–e wrapped around one or both of the pole pieces of the pair. All of the pairs of pole pieces may be energized via coils 62 wrapped around common arms.

Gravity is relied upon to hold the ferrofluid in the position shown in FIGS. 3–4 when the magnetic pole pieces are de-energized. If a pole piece pair, e.g., 54c and 56c, is energized by causing a current to flow in coil 60c, a magnetic field is created between pole pieces 54c, 56c and ferrofluid flows into the field and tends to fill it as shown in FIG. 5, thereby filling coupling space 48c between light paths 42c and 46c and uncoupling these light paths. Coupling between other pairs of light paths would be unaffected by energization of coil 60c. When coil 60c is de-energized, ferrofluid in the coupling region 48c is moved back down to the resting position (FIG. 3) by gravitational force.

Any one or more of the coupling spaces 48a–e may be selectively blocked by ferrofluid through energization of the corresponding coils 60a–e. All of the coupling spaces may be blocked at the same time by energizing coils 62.

Figure 6:
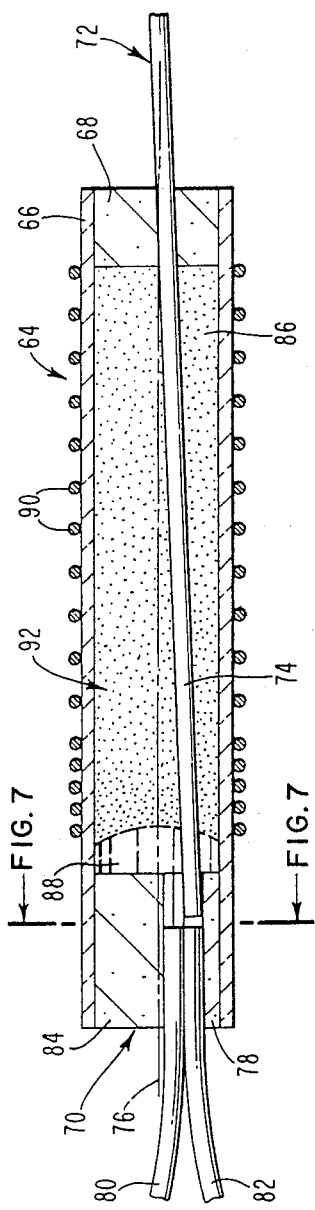
FIG. 6 is a front cross-sectional view of a single pole double throw optical switch in accordance with this invention wherein the ferrofluid density distribution changes thereby causing physical movement of an optical fiber end.
Figure 7:
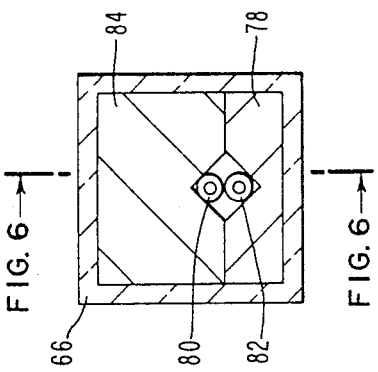
FIG. 7 is a side cross-sectional view of the optical switch of FIG. 6.

FIGS. 6–7 illustrate still another optical switch in accordance with this invention. Enclosure 64 comprises a square cross-section tube 66 having plug elements 68, 70 sealing the ends thereof. Plug 68 supports an optical fiber 72 in cantilever fashion. Fiber 72 is oriented such that the cantilevered end 74 is angled away from the axis 76 of the enclosure and rests against an alignment structure 78 in plug 70.

Plug 70 supports two optical fibers 80, 82. Fiber 82 rests in the same alignment structure 78 as does fiber 72 (at rest) and therefore is in axial alignment therewith. Fibers 72 and 82 are closely adjacent to each other so that light from either fiber couples efficiently into the other. An alignment structure 84 similar to alignment structure 78 positions fiber 80 such that when the cantilevered end 74 of fiber 72 is flexed upward, it engages structure 84 in axial alignment with fiber 80 instead of fiber 82. These structures 78, 84 may be silicon blocks, for example, in which vee-grooves have been etched.

Enclosure 64 is nearly filled with ferrofluid 86. A small space around the ends of the fibers contains index matching fluid 88 which is immiscible with the ferrofluid. Coil 90 surrounds enclosure 64 in the region which contains the ferrofluid.

Ordinarily, fiber end 74 rests in the position shown. When coil 90 is energized, the magnetic field intensity close to the coil wires is higher than the magnetic field intensity along the axis 76. Since ferrofluid is a colloidal suspension of magnetic particles, this field gradient results in a redistribution of the magnetic particles. The concentration of particles rises near the circumference 92 and drops along the axis 76. A redistribution of magnetic particles occurs also in the previously described embodiments, but no advantage was taken of such effect. In this embodiment, the ferrofluid itself does not change position. Advantage has been taken, however, of the redistribution of magnetic particles.

Since the magnetic particles are more dense than the carrier fluid of the ferrofluid, the redistribution of particles results in local changes in the density of the ferrofluid. The density of the ferrofluid becomes less at the axis 76. Buoyancy (or displacement) forces thus act upon the cantilevered end 74 of fiber 72 and tend to push it toward the axis 76, thus seating fiber end 74 into alignment structure 84. When coil 90 is energized, fiber end 74 moves from a position in alignment with fiber 82 into a position in alignment with fiber 80. When coil 90 is deenergized, the fluid forces are removed from the fiber end 74 and spring tension within the fiber restores fiber end 74 from the elastically deformed flexed position to the rest position thus moving the fiber end 74 back to a position in alignment with fiber 82.

In a practical device, some small bias current may be retained in coil 90, even in the de-energized state, so that the ferrofluid always remains in the position shown and does not tend to flow towards the fiber end faces. A small bias field would not affect the rest position of fiber end 74 so long as it does not result in bias forces on the fiber end 74 sufficient to overcome the mechanical bias of the fiber end against the alignment structure 78. Preferably, coil 90 has a larger turns density in the region close to the interface of the ferrofluid with the index matching fluid, because forces applied to the fiber end 74 in this region are more effective than those applied closer to plug 68.

The principles of our invention have been illustrated by referring to three different embodiments. Many further embodiments and variations and modifications thereof incorporating these principles may be made without departing from the spirit and scope of what we regard as our invention.

Having thus described our invention, what we claim as new and desire to secure by Letters Patent is:

1. A light switch, comprising:
   at least two optical fibers;
   ferrofluid;
   means for holding said ferrofluid such that said ferrofluid is capable of assuming at least two different configurations, a first and second of said optical fibers being optically coupled together when said ferrofluid means is in a first of said configurations and not optically coupled together when said ferrofluid means is in a second of said configurations; and
   controllable magnetic field means for causing said ferrofluid to assume a selected one of said configurations.

2. A light switch as defined in claim 1 and comprising at least three optical fibers, said first optical fiber being coupled to a third optical fiber when said ferrofluid is in said second configuration.

3. A light switch as defined in claim 1 wherein said at least two optical fibers comprise at least four optical fibers, said ferrofluid being capable of being brought into at least four different configurations, said first and second optical fibers being coupled together when said ferrofluid is either in said first configuration or in a third of said configurations and not coupled together when said ferrofluid is in either said second configuration or in a fourth of said configurations, a third and fourth optical fibers being coupled together when said ferrofluid is in either said first or second configurations and not coupled together when said ferrofluid is in either said third or fourth configurations.

4. A light switch as defined in claim 1 wherein said ferrofluid is brought into different configurations by moving ferrofluid to different positions.

5. A light switch as defined in claim 4 wherein said ferrofluid is moved by a magnetic field generated by said magnetic field means.

6. A light switch as defined in claim 1 wherein said ferrofluid is brought into different configurations by changing the distribution of magnetic particles within said ferrofluid.

7. A light switch as defined in claim 6 wherein said ferrofluid does not substantially change position when the distribution of magnetic particles within said ferrofluid is changed.

8. A light switch as defined in claim 6 wherein the distribution of magnetic particles within said ferrofluid is changed by a magnetic field generated by said magnetic field means.

9. A light switch as defined in claim 6 wherein said changing of the distribution of magnetic particles within said ferrofluid changes the density distribution of said ferrofluid.

10. A light switch as defined in claim 9 wherein said changing of the density distribution of said ferrofluid changes the distribution of buoyancy forces of said ferrofluid upon a movable member in contact with said ferrofluid, thus causing movement of said member.

11. A light switch as defined in claim 10 wherein said movable member comprises said first optical fiber and said first optical fiber is cantilevered for movement.

12. A light switch as defined in claim 11 wherein said cantilevered first optical fiber may be controllably brought by said ferrofluid into a predetermined position with respect to said second optical fiber, said predetermined position corresponding to either an optical coupling or uncoupling of said first and second fibers.

13. A light switch as defined in claim 12 wherein said cantilevered first optical fiber tends to be brought away from said predetermined position by elastic deformation forces of said cantilevered fiber.

14. A light switch as defined in claim 1 wherein said first and second optical fibers are in spaced alignment with each other, so that light will travel from one of said optical fibers through a space between said optical fibers and into the other of said optical fibers when said space contains a medium transparent to the light, said first configuration corresponding to said space containing a transparent medium and said second configuration corresponding to said space containing an opaque ferrofluid.

15. A light switch as defined in claim 14 wherein said opaque ferrofluid is moved into said space by a magnetic field.

16. A light switch as defined in claim 14 wherein said opaque ferrofluid is moved out of said space by a magnetic field.

17. A light switch as defined in claim 14 wherein said space corresponds to a region within a tube, said tube containing both an opaque ferrofluid and a transparent fluid, the position of said ferrofluid being controlled by a magnetic field generated by said magnetic field means.

18. A light switch as defined in claim 1 wherein at least one of said optical fibers further comprises a focusing element for directing light from said one optical fiber to another one of said optical fibers.

19. A light switch as defined in claim 1 wherein said controllable magnetic field means comprises at least one electromagnet element.

* * * * *